United States Patent
Ding et al.

(10) Patent No.: US 10,259,713 B2
(45) Date of Patent: Apr. 16, 2019

(54) POROUS CARBON HOLLOW SPHERES AND METHODS FOR THEIR PREPARATION AND USE

(71) Applicant: Xi'an Jiaotong University, Xi'an (CN)

(72) Inventors: Shujiang Ding, Xi'an (CN); Jin Liang, Xi'an (CN)

(73) Assignee: XI'AN JIAOTONG UNIVERSITY, Xi'an (CN)

( * ) Notice: Subject to any disclaimer, the term of this patent is extended or adjusted under 35 U.S.C. 154(b) by 0 days.

(21) Appl. No.: 15/555,893

(22) PCT Filed: Mar. 11, 2015

(86) PCT No.: PCT/CN2015/073976
§ 371 (c)(1),
(2) Date: Sep. 5, 2017

(87) PCT Pub. No.: WO2016/141559
PCT Pub. Date: Sep. 15, 2016

(65) Prior Publication Data
US 2018/0050915 A1    Feb. 22, 2018

(51) Int. Cl.
*C01B 32/05* (2017.01)
*C01B 32/354* (2017.01)
(Continued)

(52) U.S. Cl.
CPC ............. *C01B 32/05* (2017.08); *B01J 20/20* (2013.01); *B01J 20/265* (2013.01);
(Continued)

(58) Field of Classification Search
CPC ....... C01B 32/05; C01B 32/382; C08L 25/06; C08L 33/10; C08L 33/08; C08L 2205/03;
(Continued)

(56) References Cited

FOREIGN PATENT DOCUMENTS

CN    101024496 A       8/2007
CN    103466596 A    *  12/2013
(Continued)

OTHER PUBLICATIONS

Schäfer, C. G., et al. "A polymer based and template-directed approach towards functional multidimensional micro-structured organic/inorganic hybrid materials." Journal of Materials Chemistry C 2.37 (2014): 7960-7975.*

(Continued)

*Primary Examiner* — Richard M Rump

(57) ABSTRACT

Methods for preparing porous carbon hollow spheres are disclosed. The method includes contacting one or more polymer hollow spheres with a $SiO_2$ precursor to form one or more $SiO_2$-containing polymer hollow spheres; carbonizing the one or more $SiO_2$-containing polymer hollow spheres to form one or more $SiO_2$-containing carbon hollow spheres; and removing $SiO_2$ from the one or more $SiO_2$-containing carbon hollow spheres to form one or more porous carbon hollow spheres. The prepared porous carbon hollow spheres may be filled with liquid metal salts and treated at elevated temperatures to form filled porous carbon spheres. Methods of filling the porous carbon hollow spheres and compositions that include the filled porous carbon spheres are also disclosed.

13 Claims, 13 Drawing Sheets

(51) Int. Cl.
  *B01J 20/20* (2006.01)
  *B01J 20/26* (2006.01)
  *B01J 20/28* (2006.01)
  *C08J 7/12* (2006.01)
  *C08L 25/06* (2006.01)
  *C08L 33/08* (2006.01)
  *C08L 33/10* (2006.01)

(52) U.S. Cl.
  CPC ....... *B01J 20/28019* (2013.01); *C01B 32/382* (2017.08); *C08J 7/12* (2013.01); *C08L 25/06* (2013.01); *C08L 33/08* (2013.01); *C08L 33/10* (2013.01); *C01P 2004/34* (2013.01); *C01P 2004/60* (2013.01); *C01P 2004/64* (2013.01); *C08L 2205/03* (2013.01); *C08L 2205/20* (2013.01); *C08L 2666/58* (2013.01)

(58) Field of Classification Search
  CPC ... C08L 2666/58; C08L 2205/20; B01J 20/20; B01J 20/265; B01J 20/28019; C08J 7/12; C01P 2004/34; C01P 2004/64; C01P 2004/60
  See application file for complete search history.

(56) References Cited

FOREIGN PATENT DOCUMENTS

| | | |
|---|---|---|
| CN | 103466596 A | 12/2013 |
| CN | 103613085 A | 3/2014 |
| EP | 2065340 A1 | 6/2009 |

OTHER PUBLICATIONS

Chen, X., et al., "New easy way preparation of core/shell structured SnO2@carbon spheres and application for lithium-ion batteries," Journal of Power Sources, vol. 216, pp. 475-481 (Oct. 15, 2012).

Ding, S., et al., "Formation of SnO2 Hollow Nanospheres inside Mesoporous Silica Nanoreactors," Journal of the American Chemical Society, vol. 133, No. 1, pp. 21-23 (2011).

Ding, S., et al., "Porous carbon and carbon composite hollow spheres," Colloid and Polymer Science, vol. 286, Issue 8-9, pp. 1093-1096 (Aug. 2008).

International Search Report and Written Opinion for International Application No. PCT/CN2015/073976 dated Dec. 21, 2015, pp. 9.

Jayaprakash, N., et al., "Porous Hollow Carbon@Sulfur Composites for High-Power Lithium-Sulfur Batteries," Angewandte Chemie International Edition, vol. 50, No. 26, pp. 5904-5908 (Jun. 2011).

Lee, J., et al., "Synthesis of new nanoporous carbon materials using nanostructured silica materials as templates," Journal of Materials Chemictry, vol. 14, No. 4, pp. 478-486 (2004).

Lee, J-P, et al., "Preparation of silica nanospheres and porous polymer membranes with controlled morphologies via nanophase separation," Nanoscale Research Letters, vol. 7, Issue 1, Article ID. 440, pp. 1-7 (Aug. 2012).

Li, J., et al., "Synthesis of composite eccentric double-shelled hollow spheres," Polymer, vol. 50, Issue 16, pp. 3943-3949 (Jun. 11, 2009).

Xiao-Ying, D., et al., "Preparation of hollow carbon spheres by carbonization of polystyrene/polyaniline core-shell polymer particles," New Carbon Materials, vol. 26, No. 5, pp. 389-395 (Oct. 2011).

* cited by examiner

POROUS CARBON HOLLOW SPHERES AND METHODS FOR THEIR PREPARATION AND USE

CROSS-REFERENCE TO RELATED APPLICATION

This application is a U.S. National Stage filing under 35 U.S.C § 371 of International Application No. PCT/CN2015/073976 filed on Mar. 11, 2015 and entitled "Porous carbon hollow spheres and methods for their preparation and use", the disclosure of which is incorporated by reference in its entirety.

BACKGROUND

Unless otherwise indicated herein, the materials described in this section are not prior art to the claims in this application and are not admitted to be prior art by inclusion in this section.

Porous carbon materials have a variety of industrial applications, including applications as catalyst supports, electrodes for batteries and fuel cells, gas separation membranes, and filter media in water purification. One example of a porous carbon material is porous carbon hollow spheres, which are generally considered to be mechanically strong, good conductors of electricity, and have large surface areas for maximum possible contact with target components. Accordingly, the porous carbon hollow spheres can be useful in a wide range of industrial applications such as absorbents, hydrogen storage materials, rubber additives, catalyst supports for fuel cells, lubricants, and so on. In particular, porous carbon hollow spheres can provide shorter transportation pathways than their solid counterparts, and can be used, for example, as catalyst support materials and anode materials in lithium batteries.

Considerable efforts have been devoted to the design and manufacture of porous carbon hollow spheres. Their wide range of commercial applications has also demanded reliable and effective ways for their production. A number of approaches have been developed to synthesize porous carbon hollow spheres, for example, shock-compression techniques, shock-wave techniques, pyrolysis of core-shell latex, pyrolysis of colloid particles with core-shell structure, and solvothermal synthesis. While these approaches have resulted in porous carbon hollow spheres having acceptable thermal stability and carbon yield, they have been reported to require rigorous reaction conditions, expensive apparatus, or lack of structural control over resulting porous carbon hollow spheres. Additionally, the porous carbon hollow spheres resulting from these approaches may often be damaged easily and/or have inconsistent and heterogeneous particle sizes. Therefore, there is a need for simple, efficient and scalable methods for preparing porous carbon hollow spheres.

SUMMARY

In some embodiments, a method for preparing one or more porous carbon hollow spheres include contacting one or more polymer hollow spheres with a $SiO_2$ precursor to form one or more $SiO_2$-containing polymer hollow spheres; carbonizing the one or more $SiO_2$-containing polymer hollow spheres to form one or more $SiO_2$-containing carbon hollow spheres; and removing $SiO_2$ from the one or more $SiO_2$-containing carbon hollow spheres to form one or more porous carbon hollow spheres.

In some embodiments, a porous carbon hollow sphere is prepared by the method for preparing one or more porous carbon hollow spheres as disclosed herein.

In some embodiments, a method for filling one or more porous carbon hollow spheres includes providing one or more porous carbon hollow spheres, each including one or more cavities surrounded by a porous shell; contacting the one or more porous carbon hollow spheres with at least one liquid metal salt such that the at least one liquid metal salt infiltrates pores of the porous shell to fill at least one of the one or more cavities to form one or more metal salt-filled porous carbon spheres; and treating the one or more metal salt-filled porous carbon spheres at an elevated temperature.

In some embodiments, a filled porous carbon sphere includes one or more cavities surrounded by a porous shell, and a liquid metal salt in at least one of the one or more cavities.

In some embodiments, a composition includes at least one filled porous carbon sphere, the filled porous carbon sphere including one or more cavities surrounded by a porous shell, and a liquid metal salt in at least one of the one or more cavities.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings.

FIGS. 5A and 5B show SEM (5A) and TEM (5B) images of cross-linked polymer hollow spheres (Diameter=400 nm) that were used as starting material in Example 1; FIG. 5C shows SEM images of the sulfonated polystyrene (SPS) hollow spheres after sulfonation treatment of the cross-linked polymer hollow sphere templates as described in Example 1; FIG. 5D shows SEM images of the silica/SPS composite hollow spheres after being compounded, for example by contacting with tetraethyl orthosilicate (TEOS) as described in Example 1; FIG. 5E shows SEM images of the SiO$_2$-containing carbon hollow spheres after carbonization as described in Example 1; FIG. 5F shows SEM images of the composite porous carbon hollow spheres after silica (SiO$_2$) was removed using hydrofluoric acid as described in Example 1.

DETAILED DESCRIPTION

Figure 1:
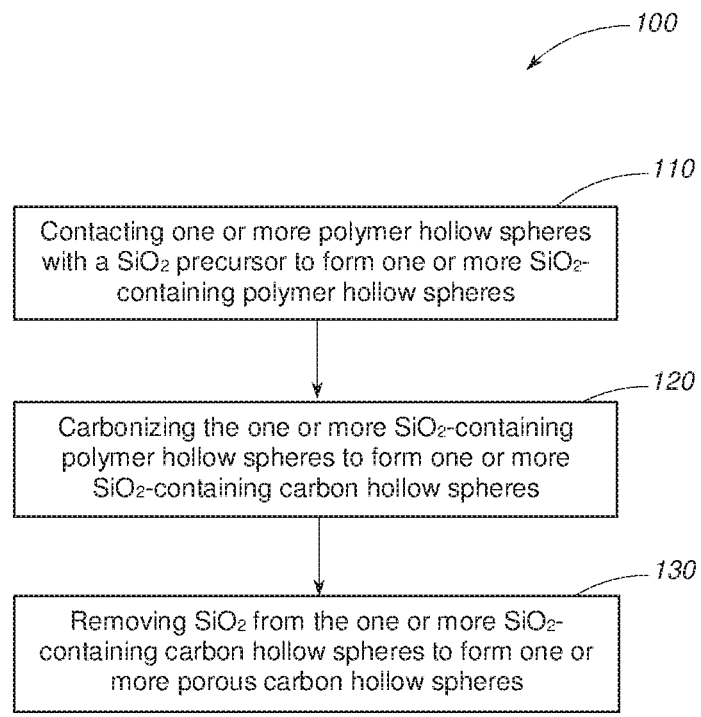
FIG. 1 is a flow diagram illustrating a non-limiting example of a method for preparing porous carbon hollow spheres in accordance with some embodiments.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

While various compositions, methods, systems, and devices are described in terms of "comprising" various components or steps (interpreted as meaning "including, but not limited to"), the compositions, methods, systems, and devices can also "consist essentially of" or "consist of" the various components and steps, and such terminology should be interpreted as defining essentially closed-member groups.

Disclosed herein, among other things, are methods for preparing porous carbon hollow spheres, and methods of filling the porous carbon hollow spheres with lithium storage materials. Also disclosed herein are compositions and industrial products that include porous carbon hollow spheres filled with lithium storage materials.

Methods for Preparing Porous Carbon Hollow Spheres

In some embodiments, the method for preparing one or more porous carbon hollow spheres includes contacting one or more polymer hollow spheres with at least one SiO$_2$ precursor to form one or more SiO$_2$-containing polymer hollow spheres; carbonizing the one or more SiO$_2$-containing polymer hollow spheres to form one or more SiO$_2$-containing carbon hollow spheres; and removing SiO$_2$ from the one or more SiO$_2$-containing carbon hollow spheres to form one or more porous carbon hollow spheres.

The use of SiO$_2$ as a precursor for preparing porous carbon hollow spheres can have one or more advantages including: (1) protects the outer surface of the polymer hollow spheres to reduce or prevent aggregation during carbonization; (2) functions as a porogent agent that helps to control pore sizes in the formed porous carbon hollow spheres; and (3) protects cavities within the SiO$_2$-containing polymer hollow spheres and the SiO$_2$-containing carbon hollow spheres from collapsing.

FIG. 1 is a flow diagram illustrating a non-limiting example of a method of making one or more porous carbon hollow spheres. As illustrated in FIG. 1, process 100 can include one or more function, operations, or actions as illustrated by one or more of operations 110 to 130.

Process 100 can begin at operation 110, "Contacting one or more polymer hollow sphere with at least one SiO$_2$ precursor to form one or more SiO$_2$-containing polymer hollow spheres." Operation 110 can be followed by operation 120, "Carbonizing the one or more SiO$_2$-containing polymer hollow spheres to form one or more SiO$_2$-containing carbon hollow spheres." Operation 120 can be followed by operation 130, "Removing SiO$_2$ from the one or more SiO$_2$-containing carbon hollow spheres to form one or more porous carbon hollow spheres."

In FIG. 1, operations 110 to 130 are illustrated as being performed sequentially with operation 110 first and operation 130 last. It will be appreciated however that these operations can be reordered, combined, and/or divided into additional or different operations as appropriate to suit particular embodiments. For example, additional operations can be added before, during or after one or more of operations 110 to 130. For example, an additional operation, "sulfonating one or more polymer hollow spheres to form one or more sulfonated polymer hollow spheres," can be optionally included before operation 110. In some embodiments, two or more of the foregoing operations can be performed at the same time.

In some embodiments, the one or more polymer hollow spheres include at least one polystyrene hollow sphere at least one polymethyl acrylate hollow sphere, at least one polymethyl methacrylate hollow sphere, or any combination thereof. In some embodiments, the one or more polymer hollow spheres include at least one cross-linked polymer hollow sphere. At operation 110 "Contacting one or more polymer hollow spheres with at least one SiO$_2$ precursor to form one or more SiO$_2$-containing polymer hollow spheres", one or more SiO$_2$ precursors can be used. Non-limiting examples of SiO$_2$ precursors include butyl orthosilicate, butyl orthosilicate, propylorthosilicate, tetraethyl orthosilicate (TEOS), or any combination thereof. In some embodiments, the at least one SiO$_2$ precursor includes tetraethyl orthosilicate (TEOS). In some embodiments, the SiO$_2$ precursor is tetraethyl orthosilicate (TEOS). In some embodiments, contacting one or more polymer hollow spheres with at least one SiO$_2$ precursor at operation 110 includes mixing the one or more polymer hollow spheres with the SiO$_2$, precursor at various mass ratios. The mass ratio of the polymer hollow sphere to the SiO$_2$ precursor can generally be any ratio, and can be, for example, about 1:18 to about 1:0.1. For example, the mass ratio of the polymer hollow sphere to the SiO$_2$ precursor is about 1:18, about 1:12, about 1:10; about 1:8, about 1:4, about 1:2, about 1:1 or a ratio between any two of these values (including endpoints). In some embodiments, the mass ratio of the polymer hollow sphere to the SiO$_2$ precursor is about 1:4 to about 1:2. In some embodiments, the mass ratio of the polymer hollow sphere to the SiO$_2$ precursor is about 1:4.

In some embodiments, contacting the one or more polymer hollow spheres with the at least one SiO$_2$ precursor at operation 110 includes contacting the one or more polymer hollow spheres with the at least one SiO$_2$ precursor for a time period sufficient for the formation of one or more SiO$_2$-containing polymer hollow spheres. The one or more polymer hollow spheres and the at least one SiO$_2$ precursor may be contacted for at least about 10 minutes, or about 10 minutes to about 12 hours. For example, the one or more polymer hollow spheres may be contacted with the at least one $SiO_2$ precursor for about 10 minutes, about 15 minutes, about 20 minutes, about 30 minutes, about 1 hour, about 2 hours, about 3 hours, about 4 hours, about 5 hours, about 10 hours, about 12 hours or a time period between any two of these values (including endpoints). In some embodiments, contacting the one or more polymer hollow spheres with the at least one $SiO_2$ precursor is performed for about 0.5 hours (30 minutes) to about 10 hours. In some embodiments, contacting the one or more polymer hollow spheres with the at least one $SiO_2$ precursor is performed for at least about 4 hours.

Operation 110 can be performed in the presence of at least one alcohol. In some embodiments, the at least one alcohol includes butanol, ethanol, isopropyl alcohol, methanol, propanol, or any combination thereof. In some embodiments, the at least one alcohol includes ethanol. In some embodiments, contacting the one or more polymer hollow spheres with the at least one $SiO_2$ precursor occurs in the presence of an alcohol solution having a ratio of water to alcohol of about 1:10 to about 1:1. The ratio of water to alcohol can, for example, be about, 1:10, 1:6, 1:4, 1:2, 1:1 or a ratio between any two of these values (including the endpoints). In some embodiments, the alcohol solution has a ratio of water to alcohol of about 1:4.

Operation 120, "Carbonizing the one or more $SiO_2$-containing polymer hollow spheres to form one or more $SiO_2$-containing carbon hollow spheres," can include heating the one or more $SiO_2$-containing polymer hollow spheres to a temperature that is effective to form one or more $SiO_2$-containing carbon hollow spheres. The one or more $SiO_2$-containing polymer hollow spheres can be heated to various temperatures during the carbonizing step. The carbonization step may be performed at a temperature of at least about 300° C., or about 300° C. to about 900° C. For example, the carbonizing step can be performed at a temperature of about 300° C., about 350° C., about 400° C., about 450° C., about 500° C., about 550° C., about 600° C., about 650° C., about 700° C., about 750° C., about 800° C., about 850° C., about 900° C., or a temperature between any two of these values (including endpoints). In some embodiments, the carbonizing step is performed at a temperature of about 500° C. to about 900° C. In some embodiments, the carbonizing step is performed at a temperature of about 800° C.

In some embodiments, operation 120, "Carbonizing or more $SiO_2$-containing polymer hollow spheres to form one or more $SiO_2$-containing carbon hollow spheres," includes heating the one or more $SiO_2$-containing polymer hollow spheres for a time period that is effective to form one or more carbon hollow spheres during the carbonization step. The carbonizing step can be performed for at least about 10 minutes, or about 10 minutes to about 24 hours. For example, the carbonizing step can be performed for about 10 minutes, about 30 minutes, about 1 hour, about 2 hours, about 4 hours, about 6 hours, about 8 hours, about 10 hours, about 15 hours, about 20 hours, about 24 hours, or any time period between any two of these values (including endpoints). In some embodiments, the carbonizing step is performed for about 0.5 hours to about 10 hours. In some embodiments, the carbonizing step is performed for about 2 hours to about 4 hours.

Operation 130, "Removing $SiO_2$ from the one or more $SiO_2$-containing carbon hollow spheres to form one or more porous carbon hollow spheres," can include contacting the one or more $SiO_2$-containing carbon hollow spheres with at least one etching reagent. The etching reagent can generally be any etching reagent, and can for example be hydrofluoric acid, potassium hydroxide, sodium hydroxide, or any combination thereof. The time period that the one or more $SiO_2$-containing carbon hollow sphere contacts the etching reagent can vary, for example, to effectively remove $SiO_2$ from the $SiO_2$-containing carbon hollow sphere to form the one or more porous carbon hollow spheres. The one or more $SiO_2$-containing carbon hollow spheres may be contacted with the etching reagent for at least about 10 minutes, or about 10 minutes to about 24 hours. For example, the one or more $SiO_2$-containing carbon hollow spheres may be contacted with the etching reagent for about 10 minutes, about 30 minutes, about 45 minutes, about 1 hour, about 2 hours, about 3 hours, about 4 hours, about 5 hours, about 6 hours, about 7 hours, about 8 hours, about 12 hours, about 24 hours, or a time period between any two of these values (including endpoints). In some embodiments, contacting the one or more $SiO_2$-containing carbon hollow spheres with the etching reagent occurs for about 0.5 hour to about 12 hours. In some embodiments, operation 130 includes contacting the one or more $SiO_2$-containing carbon hollow spheres with hydrofluoric acid for about 1 hour. In some embodiments, operation 130 includes contacting the one or more $SiO_2$-containing carbon hollow spheres with sodium hydroxide for about 6 hours.

The one or more polymer hollow spheres may be sulfonated before contacting with the at least one $SiO_2$ precursor in Operation 110. In some embodiments, the method of making the one or more porous carbon hollow sphere further includes sulfonating the one or more polymer hollow spheres before contacting with the at least one $SiO_2$ precursor (for example, before operation 110). In some embodiments, sulfonating the one or more polymer hollow spheres includes contacting the one or more polymer hollow spheres with at least one sulfonating reagent. The sulfonating step can generally be performed with any sulfonating reagents. In some embodiments, the at least one sulfonating reagent include chlorosulfonic acid, oleum, concentrated sulfuric acid, sulfur trioxide, or any combination thereof.

The sulfonating step may be performed at any temperature and for any time period that are sufficient to sulfonate the one or more polymer hollow spheres. In some embodiments, the sulfonating step is performed at a temperature of at least about 15° C., or about 15° C. to about 90° C. For example, the sulfonating step may be performed at a temperature of about 15° C., about 20° C., about 25° C., about 30° C., about 35° C., about 40° C., about 45° C., about 50° C., about 55° C., about 60° C., about 65° C., about 70° C., about 75° C., about 80° C., about 85° C., about 90° C., or a temperature between any two of these values (including endpoints). In some embodiments, the sulfonating step is performed at a temperature of about 40° C. to about 80° C. In some embodiments, the sulfonating step is performed for a time period of at least about 2 hours, or about 2 hours to about 72 hours. For example, the sulfonating step may be performed for about 2 hours, about 3 hours, about 4 hours, about 5 hours, about 10 hours, about 15 hours, about 20 hours, about 25 hours, about 30 hours, about 35 hours, about 40 hours, about 45 hours, about 50 hours, about 55 hours, about 60 hours, about 65 hours, about 70 hours, about 75 hours, about 80 hours, about 85 hours, about 90 hours, or a time period between any two of these values (including endpoints). In some embodiments, the sulfonating step is performed for about 24 hours.

Figure 2:
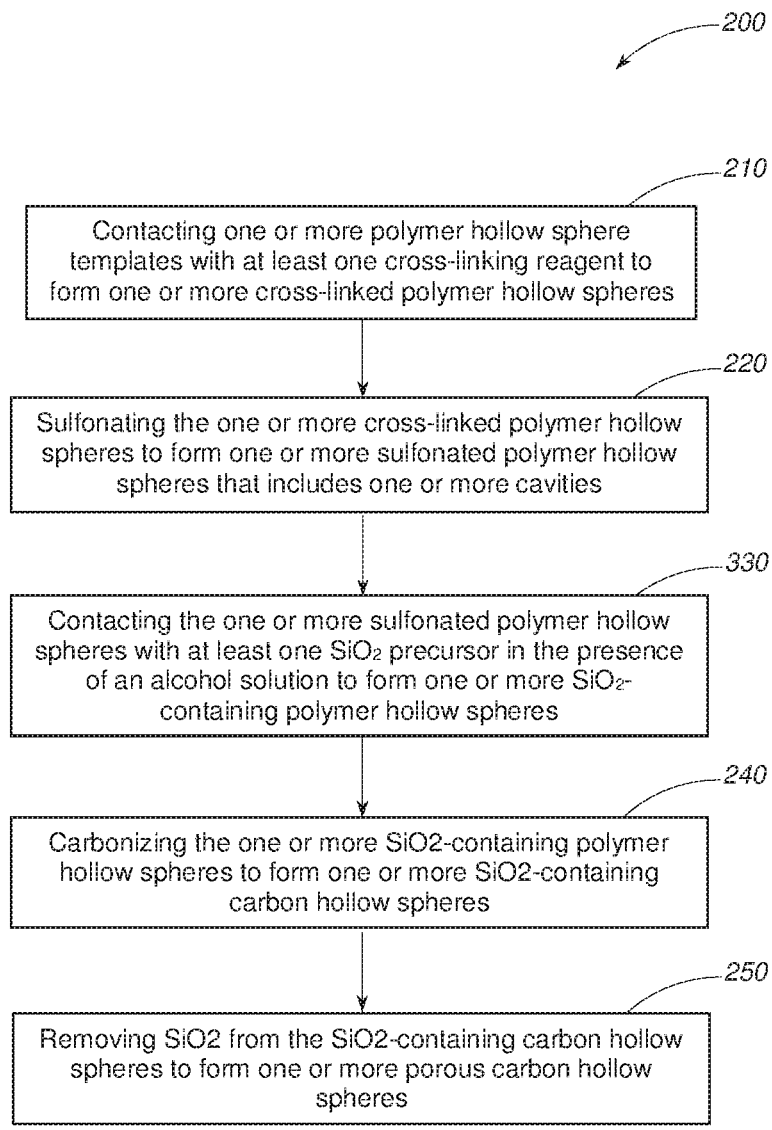
FIG. 2 is a flow diagram illustrating another non-limiting example of a method for preparing porous carbon hollow spheres in accordance with some embodiments.

FIG. 2 is a flow diagram illustrating another non-limiting example of a method of making a porous carbon hollow sphere. As illustrated in FIG. 2, process 200 can include one or more functions, operations, or actions as illustrated by one or more of operations 210 to 250.

Process 200 can begin at operation 210, "Contacting one or more polymer hollow sphere templates with at least one cross-linking reagent to form one or more cross-linked polymer hollow spheres." Operation 210 can be followed by operation 220, "Sulfonating the one or more cross-linked polymer hollow spheres to form one or more sulfonated polymer hollow spheres that includes one or more cavities." Operation 220 can be followed by operation 230, "Contacting the one or more sulfonated polymer hollow spheres with at least one $SiO_2$ precursor in the presence of an alcohol solution to form one or more $SiO_2$-containing polymer hollow spheres." Operation 230 can be followed by operation 240, "Carbonizing the one or more $SiO_2$-containing polymer hollow spheres to form one or more $SiO_2$-containing carbon hollow spheres." Operation 240 can be followed by operation 250, "Removing $SiO_2$ from the $SiO_2$-containing carbon hollow spheres to form one or more porous carbon hollow spheres."

At operation 210, "Contacting one or more polymer hollow sphere templates with at least one cross-linking reagent to form one or more cross-linked polymer hollow spheres," the one or more polymer hollow sphere templates can generally be a template synthesized using a polymer or a mixture of different polymers. In some embodiments, the polymer includes polystyrene (PS), polymethyl methacrylate (PMMA), or any combination of any thereof. In some embodiments, the one or more polymer hollow sphere templates include at least one polystyrene hollow sphere template. Non-limiting examples of the cross-linking reagent include monomer polystyrene, monomer divinylbenzene (DVB), or a mixture thereof. In some embodiments, the cross-linking reagent is a mixture of monomer polystyrene and monomer divinylbenzene. The weight ratio of monomer polystyrene to monomer DVB can generally be any ratio, and can be, for example about 1:0.5 wt/wt to about 1:2 wt/wt.

In some embodiments, the size of the resulting one or more cross-linked polymer hollow spheres can be controlled by selecting appropriate linear polymer hollow sphere templates of different sizes. In some embodiments, the degree of crosslinking and shell thickness of the resulting cross-linked polymer hollow spheres can be additionally controlled by modulating the weight ratio of the polymer sphere template to the cross-linking reagent. In some embodiments, the weight ratio of the cross-linking reagent to the polymer hollow sphere template is about 1:0.5, about 1:0.8, about 1:1, about 1:1.2, about 1:1.5, about 1:1.8, about 1:2, or a ratio between any two of these values (including the endpoints). In some embodiments, the weight ratio of the cross-linking reagent to the polymer hollow sphere template is about 1:1. Although various non-limiting examples of suitable conditions are described in the foregoing embodiments, the skilled artisan, guided by the teachings of the embodiments disclosed herein, will be able to determine other suitable conditions depending upon properties of the polymer hollow sphere template without undue experimentation.

At operation 220, "Sulfonating the one or more cross-linked polymer hollow sphere to form one or more sulfonated polymer hollow spheres that include one or more cavities," one or more sulfonating agents can be used for the sulfonation. Any sulfonating agents can generally be used. In some embodiments, the sulfonating agent is sulfuric acid. In some embodiments, sulfonating the one or more cross-linked polymer hollow sphere at operation 220 includes contacting the one or more cross-linked polymer hollow spheres with concentrated sulfuric acid as the sulfonating agent. In some embodiments, sulfonating the one or more cross-linked polymer hollow spheres at operation 220 can be performed at a temperature effective to form one or more sulfonated polymer hollow spheres, each having one or more cavities. The sulfonation step can be performed at a temperature of at least about 15° C., or about 15° C., about 20° C., about 25° C., about 30° C., about 35° C., about 40° C., about 45° C., about 50° C., about 55° C., about 60° C., about 65° C., about 70° C., about 75° C., about 80° C., about 85° C., about 90° C., or a temperature between any two of these values (including endpoints). In some embodiments, the sulfonation step at operation 220 is performed at a temperature of at least about 15° C., or about 15° C. to about 90° C.

In some embodiments, the sulfonation step is performed at a temperature of at least about 40° C., or about 40° C. to about 80° C. In some embodiments, sulfonating the cross-linked polymer hollow sphere at operation 220 is performed at a suitable temperature over a time period that is sufficient for formation of the one or more sulfonated polymer hollow spheres, each having one or more cavities. In some embodiments, the sulfonation step can be performed for at least about 30 minutes, or about 30 minutes to about 72 hours. For example, the sulfonation can be performed for about 30 minutes, about 1 hour, about 2 hours, about 4 hours, about 8 hours, about 16 hours, about 16 hours, about 24 hours, about 36 hours, about 48 hours, about 60 hours, about 72 hours, or any time period between any two of these values (including endpoints). In some embodiments, the sulfonation step can be performed for about 2 hours to about 72 hours. In some embodiments, the sulfonation step can be performed for about 24 hours.

At operation 230, "Contacting the one or more sulfonated polymer hollow spheres with at least one $SiO_2$ precursor in the presence of an alcohol solution to form one or more $SiO_2$-containing polymer hollow spheres," one or more $SiO_2$ precursors can be used. Any $SiO_2$ precursors can generally be used. Non-limiting examples of $SiO_2$ precursors include butyl orthosilicate, butyl orthosilicate, propylorthosilicate, tetraethyl orthosilicate (TEOS), or any combination thereof. In some embodiments, the at least one $SiO_2$ precursor includes tetraethyl orthosilicate (TEOS). In some embodiments, contacting the one or more sulfonated polymer hollow spheres with at least one $SiO_2$ precursor at operation 230 includes mixing the one or more sulfonated polymer hollow spheres with the at least one $SiO_2$ precursor at various mass ratios. The mass ratio of the sulfonated polymer hollow sphere to the $SiO_2$ precursor can generally be any ratio, and can be, for example, about 1:15 to about 1:0.1. In some embodiments, the mass ratio of the sulfonated polymer hollow sphere to the $SiO_2$ precursor is about 1:18, about 1:14, about 1:10; about 1:8, about 1:4, about 1:2, about 1:1 or a ratio between any two of these values (including endpoints). In some embodiments, the mass ratio of the sulfonated polymer hollow sphere to the $SiO_2$ precursor is about 1:4 to about 1:2. In some embodiments, the mass ratio of the sulfonated polymer hollow sphere to the $SiO_2$ precursor is about 1:4.

In some embodiments, contacting the one or more sulfonated polymer hollow spheres with at least one $SiO_2$ precursor at operation 230 includes contacting the one or more sulfonated polymer hollow spheres with the at least one $SiO_2$ precursor for a time period sufficient for the formation of a $SiO_2$-containing polymer hollow sphere. For example, the sulfonated polymer hollow sphere can be contacted with the at least one $SiO_2$ precursor for about 10 minutes, about 15 minutes, about 20 minutes, about 30 minutes, about 1 hour, about 2 hours, about 3 hours, about 4 hours, about 5 hours, about 10 hours, about 12 hours or a time period between any two of these values (including endpoints). In some embodiments, the sulfonated polymer hollow sphere can be contacted with the at least one $SiO_2$ precursor for at least about 0.5 hours, or about 0.5 hours to about 10 hours. In some embodiments, the sulfonated polymer hollow sphere can be contacted with the at least one $SiO_2$ precursor for about 4 hours.

Operation 230 can be performed the presence of an alcohol solution. In some embodiments, the alcohol solution can be a mixture of water and at least one alcohol. In some embodiments, the at least one alcohol includes butanol, ethanol, isopropyl alcohol, methanol, propanol, or any combination thereof. In some embodiments, the at least one alcohol includes ethanol. In some embodiments, contacting the one or more sulfonated polymer hollow spheres with at least one $SiO_2$ precursor occurs in the presence of an alcohol solution having a volume ratio of water to alcohol of about 1:10 to about 1:1. The volume ratio of water to alcohol can, for example, be about, 1:10, 1:8, 1:6, 1:4, 1:2, 1:1 or a ratio between any two of these values (including the endpoints). In some embodiments, the alcohol solution has a volume ratio of water to alcohol of about 1:4.

Operation 240, "Carbonizing the one or more $SiO_2$-containing polymer hollow spheres to form one or more $SiO_2$-containing carbon hollow spheres," can include heating the one or more $SiO_2$-containing polymer hollow sphere to a temperature that is effective to form one or more $SiO_2$-containing carbon hollow spheres. The one or more $SiO_2$-containing polymer hollow spheres can be heated to various temperatures during the carbonizing step. The carbonization step may be performed at a temperature of at least about 300° C., or about 300° C. to about 900° C. For example, the carbonizing step can be performed at a temperature of about 300° C., about 350° C., about 400° C., about 450° C., about 500° C., about 550° C., about 600° C., about 650° C., about 700° C., about 750° C., about 800° C., about 850° C., about 900° C., or a temperature between any two of these values (including endpoints). In some embodiments, the carbonizing step is performed at a temperature of at least about 500° C., or about 500° C. to about 900° C. In some embodiments, the carbonizing step is performed at a temperature of about 800° C.

In some embodiments, operation 240, "Carbonizing the one or more $SiO_2$-containing polymer hollow spheres to form one or more $SiO_2$-containing carbon hollow spheres," includes heating the one or more $SiO_2$-containing polymer hollow spheres for a time period that is effective to form one or more carbon hollow spheres during the carbonization step. The carbonizing step can be performed for at least about 10 minutes, or about 10 minutes to about 24 hours. For example, the carbonizing step can be performed for about 10 minutes, about 30 minutes, about 1 hour, about 2 hours, about 4 hours, about 6 hours, about 8 hours, about 10 hours, about 15 hours, about 20 hours, about 24 hours, or any time period between any two of these values (including endpoints). In some embodiments, the carbonizing step is performed for at least about 0.5 hours, or about 0.5 hours to about 10 hours. In some embodiments, the carbonizing step is performed for about 2 hours to about 4 hours.

Operation 250, "Removing $SiO_2$ from the one or more $SiO_2$-containing carbon hollow spheres to form one or more porous carbon hollow spheres," can include contacting the one or more $SiO_2$-containing carbon hollow spheres with at least one etching reagent. The at least one etching reagent can generally be any etching reagent, and can for example include hydrofluoric acid, potassium hydroxide, sodium hydroxide, or any combination thereof. The time period that the one or more $SiO_2$-containing carbon hollow spheres contact the at least one etching reagent can vary, for example, to effectively remove $SiO_2$ from the one or more $SiO_2$-containing carbon hollow spheres to form the one or more porous carbon hollow spheres. The one or more $SiO_2$-containing carbon hollow spheres may be contacted with the at least one etching reagent for at least about 10 minutes, or about 10 minutes to about 24 hours. For example, the one or more $SiO_2$-containing carbon hollow spheres may be contacted with the at least one etching reagent for about 10 minutes, about 30 minutes, about 45 minutes, about 1 hour, about 2 hours, about 3 hours, about 4 hours, about 5 hours, about 6 hours, about 7 hours, about 8 hours, about 12 hours, about 24 hours, or a time period between any two of these values (including endpoints). In some embodiments, contacting the one or more $SiO_2$-containing carbon hollow spheres with the at least one etching reagent can occur for about 0.5 hour to about 12 hours. In some embodiments, operation 250 includes contacting the one or more $SiO_2$-containing carbon hollow spheres with hydrofluoric acid for about 1 hour. In some embodiments, operation 250 includes contacting the one or more $SiO_2$-containing carbon hollow spheres with sodium hydroxide for about 6 hours.

In FIG. 2, operations 210 to 250 are illustrated as being performed sequentially with operation 210 first and operation 250 last. It will be appreciated however that these operations can be reordered, combined, and/or divided into additional or different operations as appropriate to suit particular embodiments. For example, additional operations can be added before, during or after one or more of operations 210 to 250. For example, an additional operation, "Filling the one or more porous carbon hollow spheres with at least one lithium storage material or at least one liquid metal salt," can be optionally included after operation 250. In some embodiments, the optional operation of filling the porous carbon hollow sphere with at least one lithium storage material or at least one liquid metal salt is performed by gel polymer induction methods, sol-gel methods, or melt-diffusion methods. In some embodiments, the optional operation of filling the one or more porous carbon hollow spheres with at least one lithium storage material or at least one liquid metal salt is performed by a gel polymer induction method. In some embodiments, the optional operation of filling the one or more porous carbon hollow sphere with at least one lithium storage material or at least one liquid metal salt is performed by a process in accordance with at least some examples of a method for filling a porous carbon hollow sphere 300 disclosed herein.

Methods for Filling Porous Carbon Hollow Spheres

The one or more porous carbon hollow spheres can be filled with at least one liquid metal salt, which can undergo heat treatment to form a lithium storage material such as a metal oxide. In some embodiments, the method of filling one or more porous carbon hollow spheres includes providing one or more porous carbon hollow spheres, each having one or more cavities surrounded by a porous shell; contacting the porous carbon hollow sphere with at least one liquid metal salt such that the liquid metal salt infiltrates pores of the porous shell to fill at least one of the one or more cavities to form a metal salt-filled porous carbon sphere; and treating the metal salt-filled porous carbon sphere at an elevated temperature.

Figure 3:
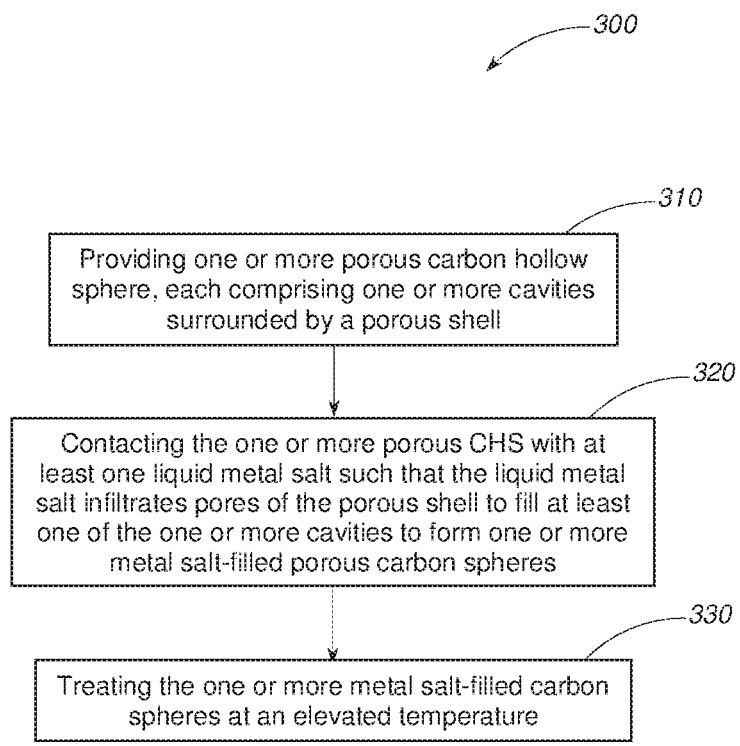
FIG. 3 is a flow diagram illustrating a non-limiting example of a method for filling a porous carbon hollow sphere with a liquid metal salt, and heat treating the metal salt-filled carbon sphere in accordance with some embodiments.

FIG. 3 is a flow diagram illustrating a non-limiting example of a method of filling a porous carbon hollow sphere. As illustrated in FIG. 3, method 300 can include one or more functions, operations, or actions as illustrated by one or more of operations 310 to 330.

Process 300 can begin at operation 310, "Providing one or more porous carbon hollow spheres, each having one or more cavities surrounded by a porous shell." Operation 310 can be followed by operation 320, "Contacting the one or more porous carbon hollow spheres with at least one liquid metal salt such that the liquid metal salt infiltrates pores of the porous shell to fill at least one of the one or more cavities to form one or more metal salt-filled porous carbon spheres." Operation 320 can be followed by operation 330, "Treating the one or more metal salt-filled porous carbon spheres at an elevated temperature."

In FIG. 3, operations 310 to 330 are illustrated as being performed sequentially with operation 310 first and operation 330 last. It will be appreciated however that these operations can be reordered, combined, and/or divided into additional or different operations as appropriate to suit particular embodiments. For example, additional operations can be added before, during or after one or more of operations 310 to 330. For example, an additional operation, "Isolating the one or more metal salt-filled porous carbon spheres," can be optionally included after operation 320. In some embodiments, two or more of the foregoing operations can be performed at the same time.

At operation 310, "Providing one or more porous carbon hollow spheres, each having one or more cavities surrounded by a porous shell," the porous carbon hollow spheres can be of any shape and size. The pores of the shell that surrounds that one or more cavities may be of sizes that can enable the liquid metal salt to infiltrate into the one or more cavities. In some embodiments, the one or more cavities can be uniform or substantially uniform in size. In some embodiments, the one or more cavities can have a broad range of different sizes. In some embodiments, the one or more cavities include at least one micro-cavity, at least one nano-cavity, or both. In some embodiments, the one or more cavities have an average diameter of about 80 nm to about 150 nm. For example, the one or more cavities may have an average diameter of about 80 nm, about 90 nm, about 100 nm, about 110 nm, about 120 nm, about 130 nm, about 140 nm, about 150 nm, or an average diameter between any two of these values (including endpoints). In some embodiments, the one or more cavities have an average diameter of about 5 nm to about 20 nm.

At operation 320, "Contacting the one or more porous carbon hollow spheres with at least one liquid metal salt such that the liquid metal salt infiltrates pores of the porous shell to fill at least one of the one or more cavities to form one or more metal salt-filled porous carbon spheres", the at least one liquid metal salt may include metal oxides and non-metal oxides. The non-metal oxides may include $Co(NO_3)_2 \cdot 6H_2O$, $CoSO_4 \cdot 7H_2O$, $FeSO_4 \cdot 7H_2O$, $FeCl_2 \cdot 4H_2O$, $FeCl_3 \cdot 6H_2O$, $Ni(NO_3)_2 \cdot 6H_2O$, $NiCl_2 \cdot 6H_2O$, $NiSO_4 \cdot 6H_2O$, $Zn(NO_3)_2 \cdot 6H_2O$, $FeC_2O_4 \cdot 2H_2O$, $LiNO_3$, or any combination thereof. The metal oxides may include $Fe_2O_3$, $SnO_2$, or a combination thereof. In some embodiments, the at least one liquid metal salt includes $FeC_2O_4 \cdot 2H_2O$ and $LiNO_3$. In some embodiments, the at least one liquid metal salt includes a molten salt, a, liquid mixture of a metal salt with crystal water, a solution of a metal salt, or a combination of any thereof. In some embodiments, contacting the porous carbon hollow sphere with the at least one liquid metal salt includes immersing the porous carbon hollow sphere into the at least one liquid metal salt. In some embodiments, operation 320 is carried out under negative-pressure conditions.

In some embodiments, an additional operation, "Isolating the one or more metal salt-filled porous carbon spheres," can be optionally included. In some embodiments, the optional operation, "Isolating the one or more metal salt-filled porous carbon hollow spheres", is included after operation 320. The isolating of the one or more metal salt-filled porous carbon hollow spheres is not limited to any particular techniques. Non-limiting examples of suitable techniques include filtration, centrifugation, sedimentation, washing, or any combination thereof. In some embodiments, two or more isolation techniques may be combined. In some embodiments, the isolated one or more metal salt-filled porous carbon spheres may be substantially free of the liquid metal salt after isolation from the mixture.

At operation 330, "Treating the one or more metal salt-filled porous carbon spheres at an elevated temperature," the one or more metal salt-filled porous carbon spheres can be heated to various elevated temperatures. In some embodiments, the elevated temperature is at least about 250° C., or about 250° C. to about 500° C. For example, the elevated temperature can be about 250° C., about 300° C., about 350° C., about 400° C., about 450° C., about 500° C., or a temperature between any two of these values (including endpoints). In some embodiments, the elevated temperature is about 300° C. to about 400° C. In some embodiments, treating the one or more metal salt-filled porous carbon hollow spheres is performed in the presence of at least one inert gas. The inert gas can, for example, be nitrogen ($N_2$) gas or argon (Ar) gas. The treatment at elevated temperatures generally results in densification of the liquid metal salt inside the cavities. Depending on the type of liquid metal salt, the treatment at elevated temperatures may additionally serve different functions. Where the liquid metal salt is a non-metal oxide, the treating of the one or more metal salt-filled carbon spheres at an elevated temperature converts the liquid metal salt in the one or more cavities to a metal oxide. Where the liquid metal salt is a liquid mixture of a metal salt with crystal water or a solution of a metal salt, the treatment at elevated temperatures removes the water or solvent. Operation 330 can include, for example, maintaining the one or more metal salt-filled porous carbon spheres at a suitable temperature over a time period that is sufficient for the conversion of the liquid metal salt in the cavity to a metal oxide. The time period for which the one or more metal salt-filled porous carbon spheres is heated is not particularly limited, for example, the one or more metal salt-filed porous carbon spheres can be heated for at least about 0.5 hour, or about 0.5 hour (30 minutes) to about 10 hours, including about 30 minutes, about 1 hour, about 2 hours, about 4 hours, about 6 hours, about 8 hours, about 10 hours, or a time period between any two of these values (including endpoints). In some embodiments, the one or more metal salt-filled porous carbon spheres are heated for about 2 hours to about 5 hours.

Although various non-limiting examples of suitable conditions are described in the foregoing embodiments, the skilled artisan, guided by the teachings of the disclosed embodiments, will be able to determine other suitable conditions depending upon properties of the porous carbon hollow spheres without undue experimentation.

Some embodiments disclosed herein provide a filled porous carbon sphere having one or more cavities surrounded by a porous shell, and at least one liquid metal salt in at least one of the one or more cavities. The filled porous carbon sphere can be prepared using any of the methods disclosed herein. For example, the porous carbon hollow sphere can be prepared by the method depicted in FIG. 1 or FIG. 2, and the porous carbon hollow sphere can be filled according to the method depicted in FIG. 3. In some embodiments, the isolated metal salt-filled porous carbon spheres may be substantially free of the liquid metal salt after isolation from the reaction mixture. In some embodiments, the one or more cavities of the metal salt-filled porous carbon spheres can be uniform or substantially uniform. In some embodiments, the one or more cavities have a broad range of different sizes. In some embodiments, the one or more cavities include at least one micro-cavity, at least one nano-cavity, or both. In some embodiments, the one or more cavities have an average diameter of about 80 nm to about 150 nm. In some embodiments, the one or more cavities have an average diameter of about 5 nm to about 20 nm. In some embodiments, the at least one liquid metal salt includes non-metal oxides such as $Co(NO_3)_2.6H_2O$, $CoSO_4.7H_2O$, $FeSO_4.7H_2O$, $FeCl_2.4H_2O$, $FeCl_3.6H_2O$, $Ni(NO_3)_2.6H_2O$, $NiCl_2.6H_2O$, $NiSO_4.6H_2O$, $Zn(NO_3)_2.6H_2O$, $FeC_2O_4.2H_2O$, $LiNO_3$, or any combination thereof. In some embodiments, the at least one liquid metal salt includes metal oxides such as $Fe_2O_3$, $SnO_2$, or a combination thereof. Where the liquid metal salt is a non-metal oxide, the liquid metal salt in the one or more cavities can be converted to a metal oxide under treated at an elevated temperature as described above.

The method for filling porous carbon hollow spheres with at least one liquid metal salt, which can be subsequently converted to a lithium storage material in metal oxide form, can alleviate the problem of poor cycling performance of lithium ion cells. In some embodiments, the content of the lithium storage material in the cavities can be controlled such that void spaces can be reserved in the cavities of the spheres to buffer the volume expansion of the materials after a discharging process. This method can be advantageous because the category of electrode materials and the filling amount impact the final performance of lithium ion cells. Also, the filling amount impacts the performance of the lithium-filled composite materials, because a proper lithium filling amount typically results in composite materials having superior electrochemical performance. In addition, different lithium storage materials have different volume alterations after charge/discharge cycles, and therefore the impact of the category of lithium storage materials and the mixing ratio of the liquid metal salt to the carbon hollow spheres on the performance of the composite is also very important. In some embodiments, the method disclosed herein allows control of the ratio of polymer template to cross-linking reagent and the amount of lithium storage material contained in the porous CHSs.

Figure 4:
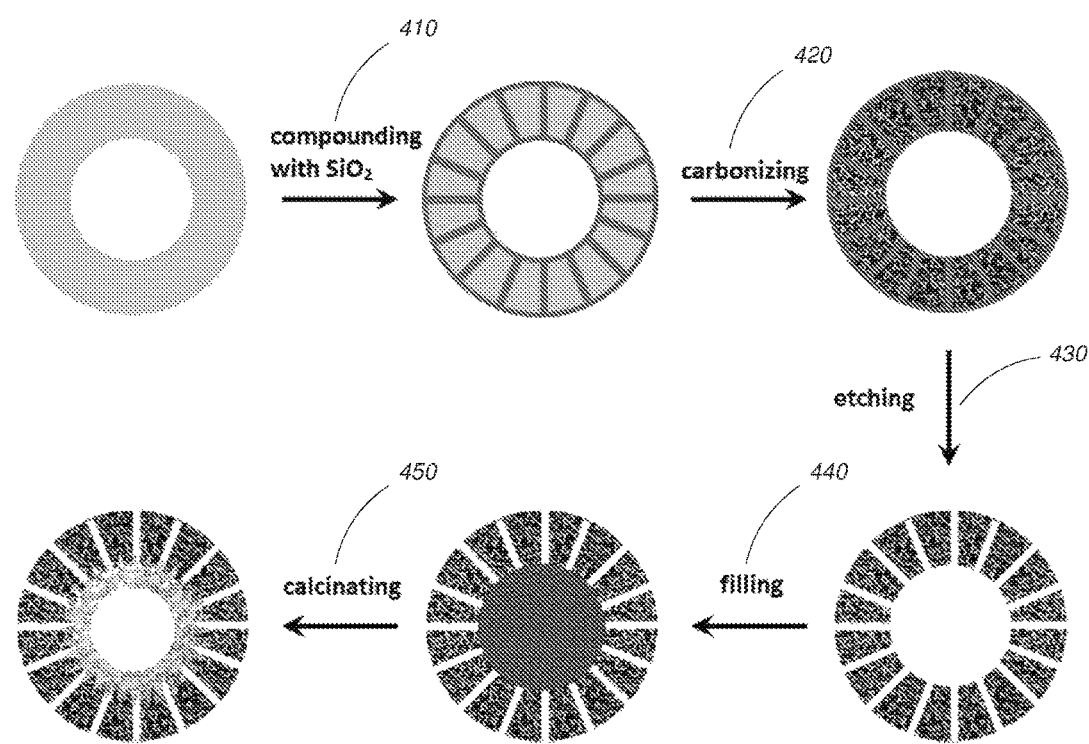
FIG. 4 is a flow diagram illustrating a non-limiting example of a process of preparing porous carbon hollow spheres filled with a lithium storage material (for example, a metal oxide) in accordance with some embodiments.

FIG. 4 is a flow diagram illustrating a non-limiting example of a method of preparing porous carbon hollow spheres, which can be filled with at least one liquid metal salt. As schematically illustrated in FIG. 4, the method can be initiated by a polymerization step in which sulfonated polymer hollow spheres are contacted with at least one $SiO_2$ precursor to produce $SiO_2$-containing polymer hollow spheres 410. The polymerization step can be performed using any one of the following techniques: gel polymer induction methods, sol-gel methods, or melt-diffusion methods. In one example, the polymerization step can be performed using a gel polymer induction technique in which the $SiO_2$ precursor is allowed to grow and/or swell onto the outer surfaces, shells, and cavities of the polymer hollow spheres. In some embodiments, the polymerization step is followed by a carbonization step 420. The carbonization step is typically catalyzed by embedded sulfonic acid moiety (—$SO_3H$) and converts the sulfonated $SiO_2$-containing polymer hollow spheres into $SiO_2$-containing carbon hollow spheres. Subsequently, $SiO_2$ can be removed by using a selective etching procedure 430 to yield porous carbon hollow spheres. In some embodiments, the etching step is performed by treating the carbonized $SiO_2$-carbon composite hollow spheres with a hydrofluoric acid (HF) solution or a sodium hydroxide (NaOH) solution. Small molecules released during the carbonization step 420 and the etching process 430 create cavities within the $SiO_2$-containing carbon hollow spheres and form a porous network. Concomitantly, various building components, including metal ions and clusters of metal oxide, can be readily absorbed or grown within the $SiO_2$-containing carbon hollow spheres. Suitable liquid metal salts, for example metal oxide precursors, can then be used to fill the cavities of the porous CHSs 440 to form metal salt-filled carbon spheres. Various filling methods such as vapor deposition, solution filling, or low-temperature molten salt permeation, can be used at this step to fill the cavities of the porous CHSs. Subsequently, the metal salt-filled carbon spheres can be calcinated at an elevated temperature 450, wherein the liquid metal salt in the one or more cavities is converted to a metal oxide.

In some embodiments, the methods disclosed herein can include preparing porous carbon hollow spheres and filling the porous carbon hollow spheres with a lithium storage material. The methods present a number of significant advantages such as to provide a greater control of the content of lithium storage material within the cavities of the CHSs, thus providing for a greater control in the optimization of the filling density, discharge capacity, and cycling stability of the CHS products.

Further disclosed herein are compositions including at least one filled porous carbon sphere, the filled porous carbon sphere including one or more cavities surrounded by a porous shell, and at least one liquid metal salt in at least one of the one or more cavities, wherein the liquid metal salt is configured to be converted to metal oxide upon heat-treatment at an elevated temperature. In some embodiments, the filled porous carbon sphere includes metal oxide derived from heat treatment of at least one liquid metal salt containing $Co(NO_3)_2.6H_2O$, $CoSO_4.7H_2O$, $FeSO_4.7H_2O$, $FeCl_2.4H_2O$, $FeCl_3.6H_2O$, $Ni(NO_3)2.6H_2O$, $NiCl_2.6H_2O$, $NiSO_4.6H_2O$, $Zn(NO_3)_2.6H_2O$, $FeC_2O_4.2H_2O$, $LiNO_3$, or any combination thereof. In some embodiments, the filled porous carbon sphere is present in the composition at a concentration of about 1%, 5%, 10%, 15%, 20%, 30%, 35%, 40%, 45%, 50%, 55%, 60%, 65%, 70%, 75%, 80%, 85%, 90%, 95%, 96%, 97%, 98%, 99%, or 100% by weight of the composition. In some embodiments, the filled porous carbon sphere is present in the composition at a concentration of about 1% to about 90% by weight of the composition. In some embodiments, the filled porous carbon sphere is present in the composition at a concentration of about 25% to about 70% by weight of the composition. In some embodiments, the filled porous carbon sphere is present in the composition in a concentration of about 40% to about 80% by weight of the composition.

In some embodiments, the composition can be configured into industrial products. Examples of industrial products include absorbents, batteries, catalyst supports, electrodes, lubricants, nanocomposites, rubber additives, sensors, and any combination thereof.

Although various non-limiting examples of suitable conditions are described in the disclosed embodiments, the skilled artisan, guided by the teachings of the disclosed embodiments, will determine other suitable conditions depending upon properties of the second organic solvent in the mixture without undue experimentation.

EXAMPLES

Additional embodiments are disclosed in further detail in following examples, which are not in any way intended to limit the scope of the claims.

Example 1

Preparation of Porous Carbon Hollow Spheres

This Example illustrates a non-limiting example of a method for preparing porous carbon hollow spheres (CHS).

Cross-Linking

Cross-linked polystyrene hollow spheres were prepared by polymerizing a cross-linking reagent with the shell of polystyrene hollow spheres to form cross-linked polymer hollow spheres. The polymerization step was conducted at 80° C. for 12 hours. Generally, the size of the final cross-linked polymer hollow spheres could be controlled by appropriately selecting linear polymer templates of different sizes. Additionally, the degree of cross-linking and shell thickness of the final cross-linked polymer hollow spheres could be controlled by modulating the weight ratio of the polymer hollow sphere templates to the cross-linking reagents. In some experiments, the typical weight ratio of cross-linking reagent to monomer polystyrene hollow sphere templates was 1:1 wt/wt. The cross-linking reagents used in these experiments were monomer polystyrene, monomer divinylbenzene, or a mixture of monomer polystyrene and monomer divinylbenzene. In most experiments, the cross-linking reagent used was a mixture of monomer polystyrene (PS) and monomer divinylbenzene, in which the ratios of monomer polystyrene to monomer divinylbenzene (DVB) were 1:1 wt/wt. It was observed that the final composite products displayed better dispersity when the cross-linking reagent mixture contained higher amounts of DVB.

Figure 5A:
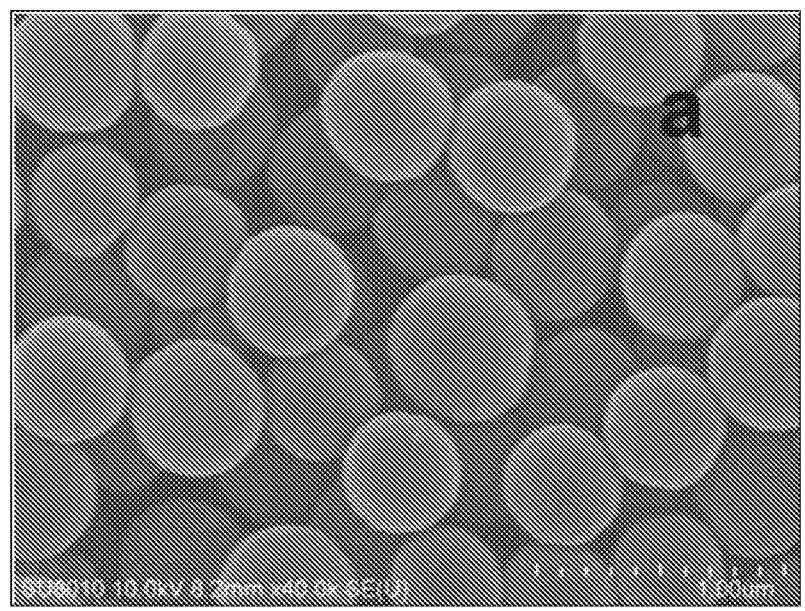
FIGS. 5A to 5F are scanning electron microscopy (SEM) and transmission electron microscopy (TEM) images of various representative hollow spheres described in Example 1.
Figure 5B:
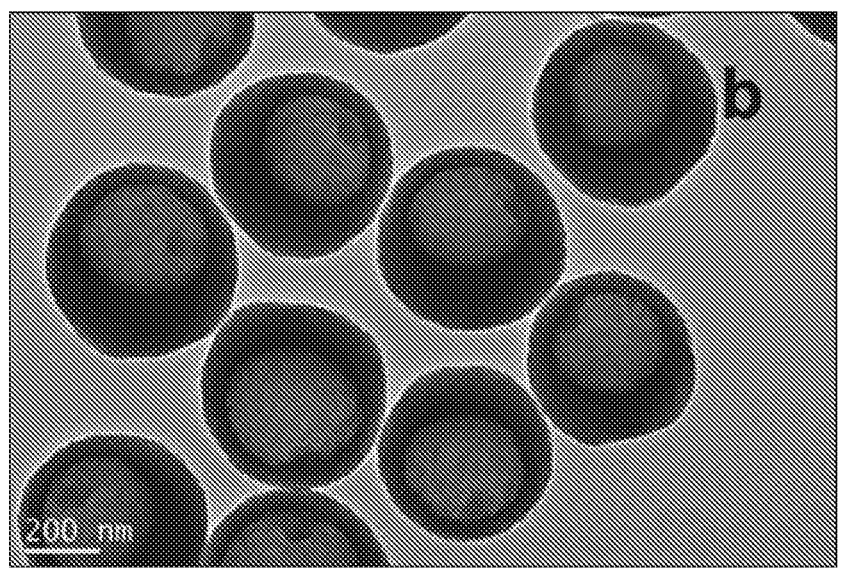

Morphology studies of the resulting cross-linked polystyrene hollow spheres were performed using scanning electron microscopy and transmission electron microscopy. Scanning electron microscopy (SEM) and transmission electron microscopy (TEM) images of the resulting cross-linked polystyrene/divinylbenzene hollow spheres are depicted in FIGS. 5A and 5B, respectively. As presented in FIGS. 5A and 5B, the cross-linked polymer hollow spheres prepared by the swelling radical polymerization procedure described herein displayed a semi-interpenetrating polymer network structure.

Sulfonation

Figure 5C:
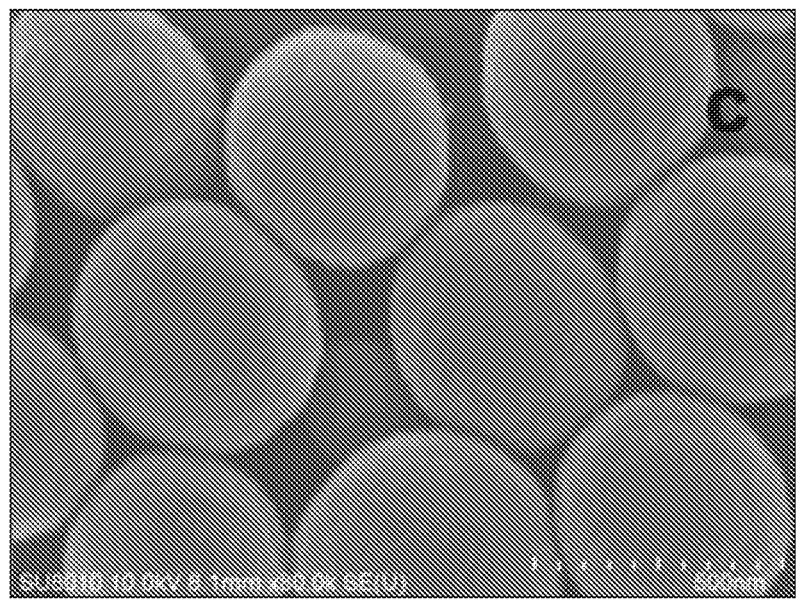

The cross-linked polymer hollow spheres prepared as described above were subsequently subjected to a sulfonation process to improve the strength of the hollow spheres. The sulfonic acid group (—$SO_3H$) was believed to adsorb metal ions and other inorganic species within the hollow spheres, which in turn allowed efficient synthesis of the end products, which are porous carbon hollow spheres. In one experiment, approximately 1 gram of the cross-linked polymer hollow spheres was dispersed in 30 grams of concentrated sulfuric acid (98% wt/wt), and stirred for 12 hours at 40° C., during which time the cross-linked polymer hollow spheres were modified by sulfonation reaction, leading to the formation of sulfonic acid group onto the surface of the cross-linked polymer hollow spheres. Based on the consideration that the sulfonation time of the cross-linked polymer hollow spheres may affect the size and the morphology of the resulting sulfonated cross-linked polymer hollow spheres, a number of sulfonation periods were tested. The test results indicated that the carbon content of the end products was positively correlated with the sulfonation time. In subsequent experiments, the sulfonation step was typically performed at 40° C. for 12 hours. The resulting sulfonated cross-linked polymer hollow spheres were collected by centrifugation and washed several times with water until the supernatant approached a neutral pH (that is, pH 5-7). A TEM image of the resulting sulfonated polymer hollow spheres is depicted in FIG. 5C, indicating that the spherical morphology of the cross-linked polymer hollow spheres was retained after being sulfonated and, as described further below, could provide robust templates for the synthesis of carbon hollow spheres.

Figure 5D:
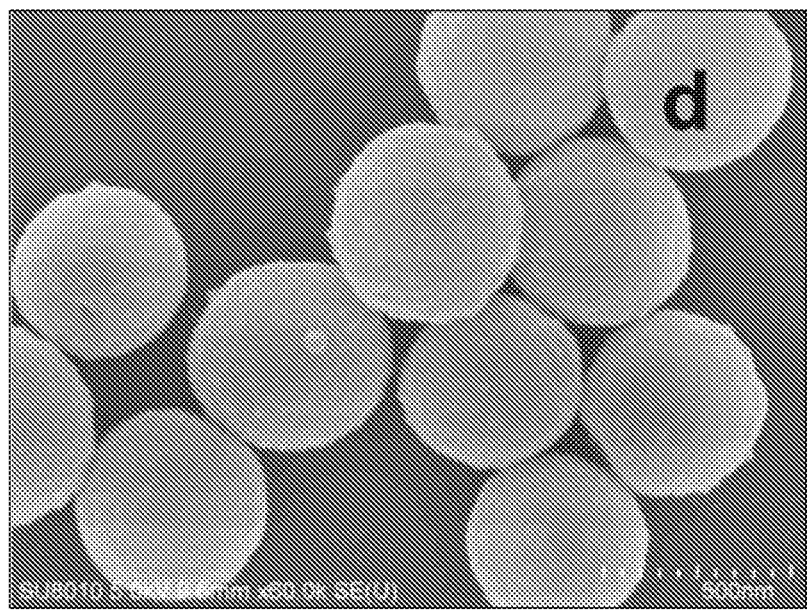

Following sulfonation, 1 gram of the resulting sulfonated cross-linked polymer hollow spheres was dispersed into 50 mL of a water and ethanol mixture. The mass ratio of water to ethanol typically was 4:1. Subsequently, 4 grams of tetraethyl orthosilicate (TEOS), a $SiO_2$ precursor, was added to the mixture and allowed to react for 8 hours. In most experiments, the mass ratio of TEOS to the cross-linked polymer hollow spheres was 1:4. As a control in this experiment, a separate reaction was performed with unsulfonated cross-linked polymer hollow spheres. A TEM image of the resulting $SiO_2$-containing polymer hollow spheres is depicted in FIG. 5D.

It was observed that the morphology of the final $SiO_2$-containing polymer hollow spheres was directly impacted by at least the following two factors: (1) the ratio of $SiO_2$ to the sulfonated cross-linked polymer hollow spheres and (2) reaction time. For example, when the ratio of sulfonated cross-linked polymer hollow spheres (SPS), such as sulfonated polystyrene spheres, to TEOS was 1:4, the $SiO_2$ precursor was observed to have grown in the surface of the SPS, whereby filling in the hollow cavities. When this ratio was adjusted to 1:2, the $SiO_2$ precursor was observed to have grown in the inner and outer surface of the spheres. Further, when this ratio was adjusted to 1:1, only the outer surface was observed to have been coated with the $SiO_2$ precursor.

Carbonization

Figure 5E:
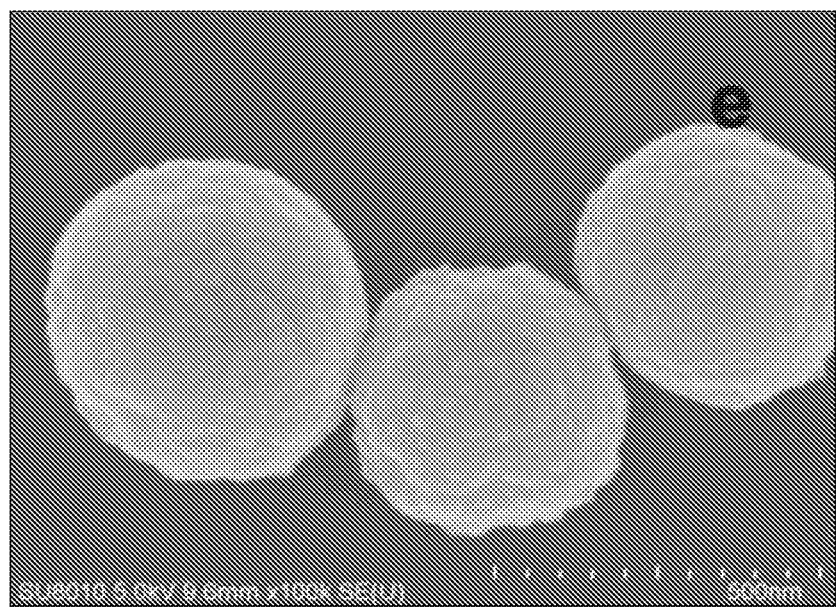

The resulting $SiO_2$-containing polymer hollow spheres were put into a tubular furnace, heated to 500° C. at a rate of 1° C./min, and held at this temperature for 240 minutes to convert the $SiO_2$-containing polymer hollow spheres into $SiO_2$-containing carbon hollow spheres The conditions such as heating rate, carbonization temperature and treatment time were expected to affect the morphology, microstructure and conductivity of the final product carbon hollow spheres. In some other experiments, the heating rates used in this carbonization process ranged from 0.5-5° C./minute, and carbonization temperature ranged from 500° C.-900° C., and the treatment time was 0.5-10 hours. It was observed that performance of the final product carbon hollow spheres was affected by the treatment time. The carbonization step was found most effective with the following parameters; the heating rate was 0.5° C./minute, the carbonization temperature was at 800° C., and the treating time ranged from 2-4 hours. It was observed that the carbon content of the final product carbon hollow spheres was affected by the treatment time. A TEM image of the morphology of the $SiO_2$-containing carbon hollow spheres after carbonization of the $SiO_2$-containing polymer hollow spheres is depicted in FIG. 5E.

Figure 5F:
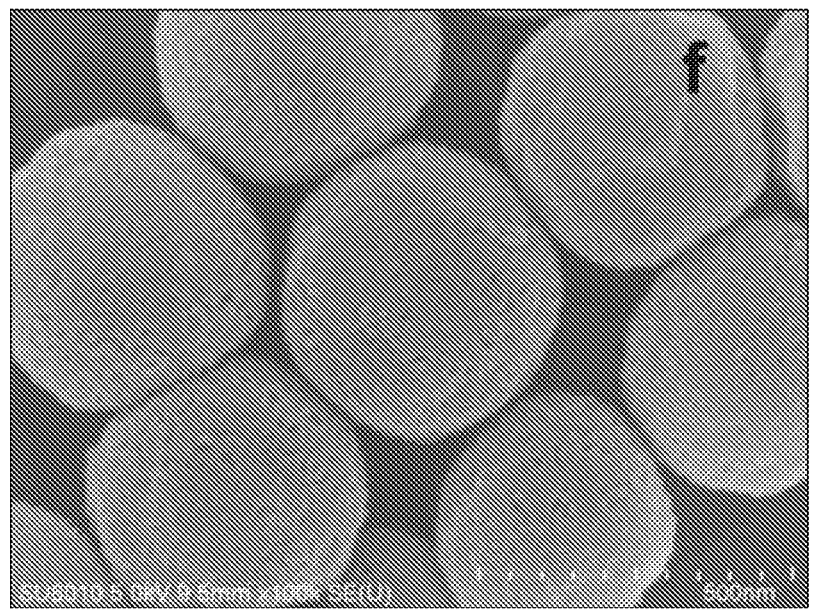
Figure 6A:
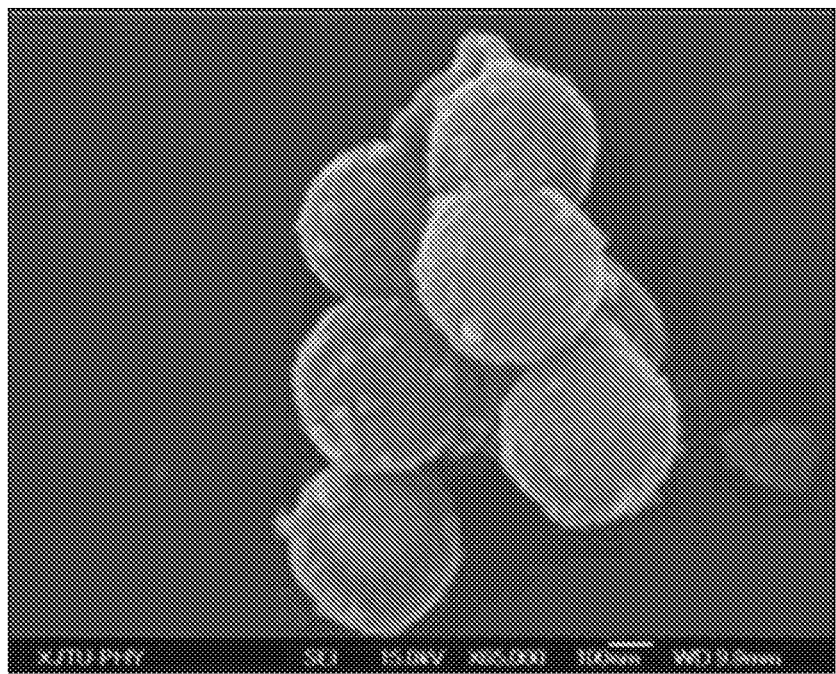
FIGS. 6A to 6D show SEM (Figures A and C) and TEM (Figures B and D) images of SnO$_2$-filled porous carbon spheres prepared in accordance with the procedure described in Example 2.
Figure 6B:
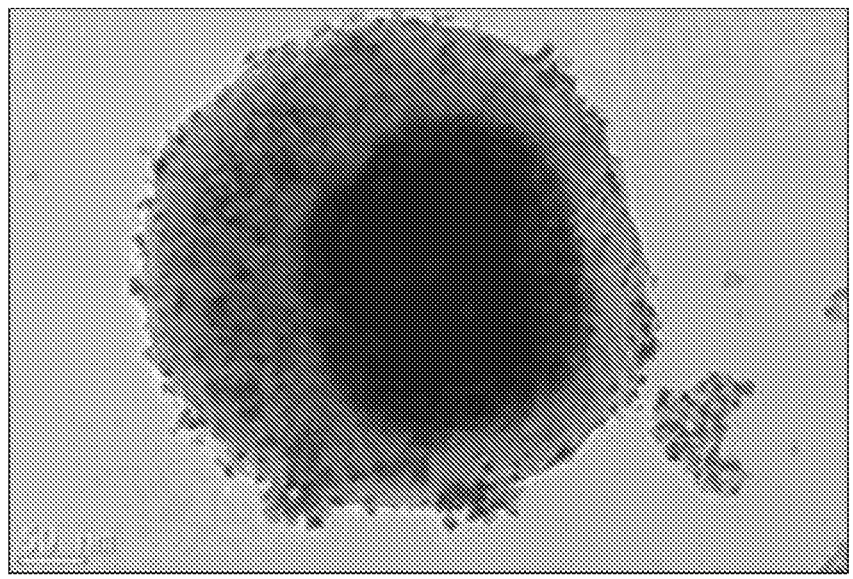
Figure 6C:
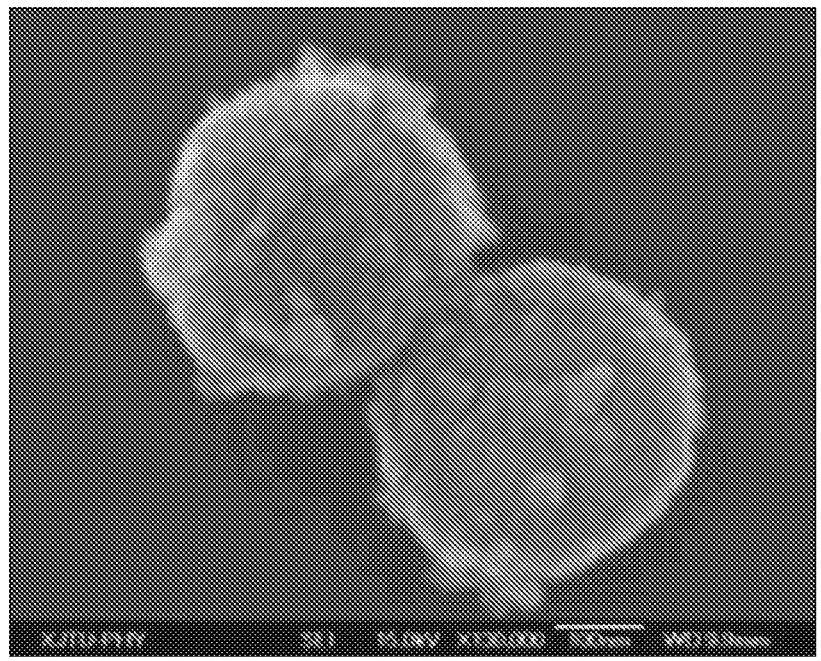
Figure 6D:
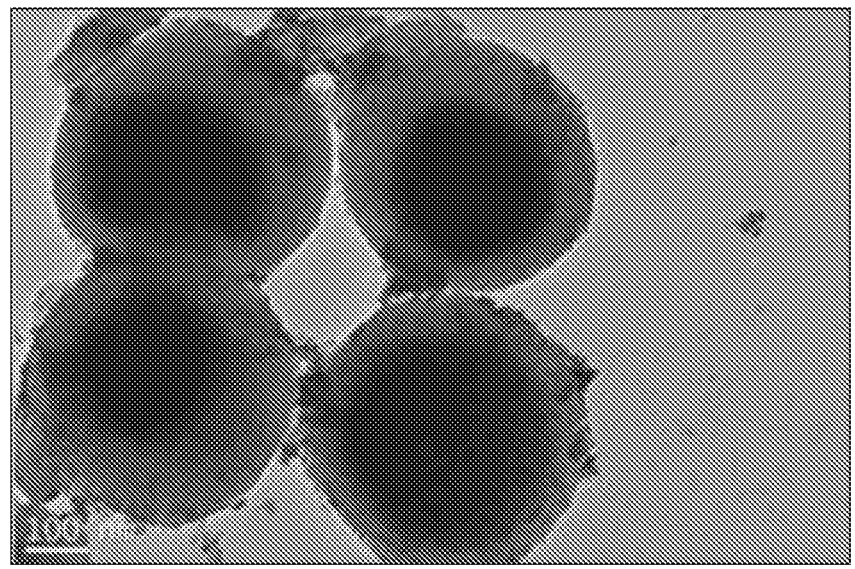
Figure 7A:
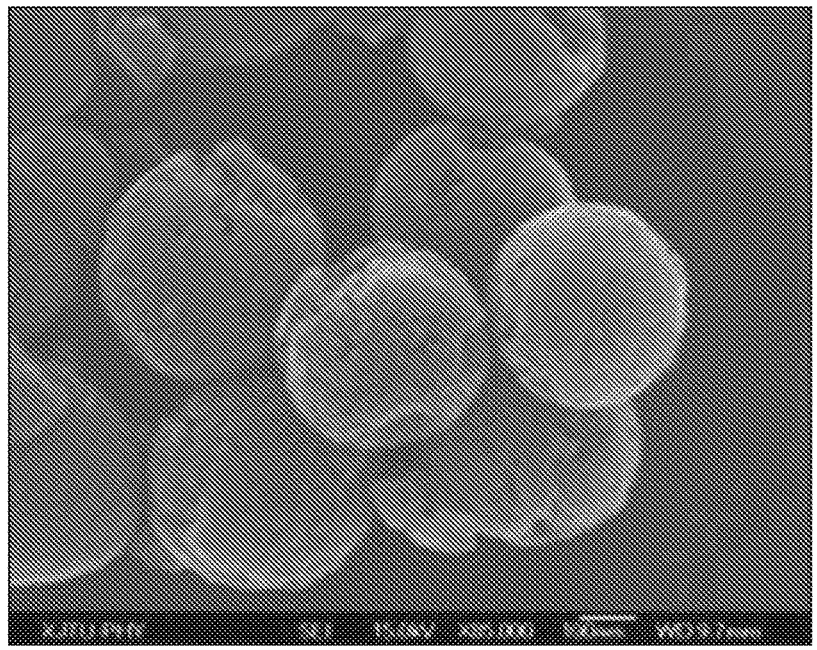
FIGS. 7A to 7D show SEM (Figures A and C) and TEM (Figures B and D) images of Fe$_2$O$_3$-filled porous carbon hollow spheres prepared in accordance with the procedure described in Example 2.
Figure 7B:
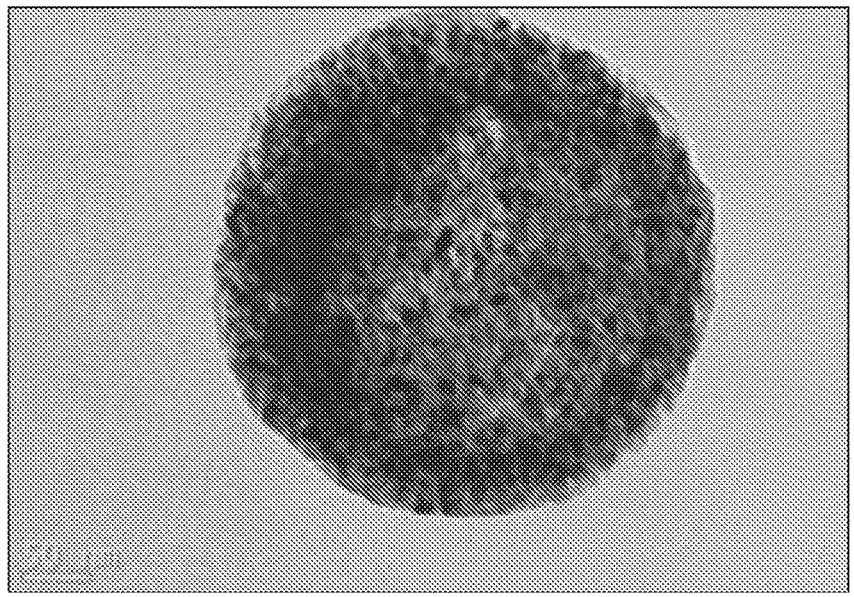
Figure 7C:
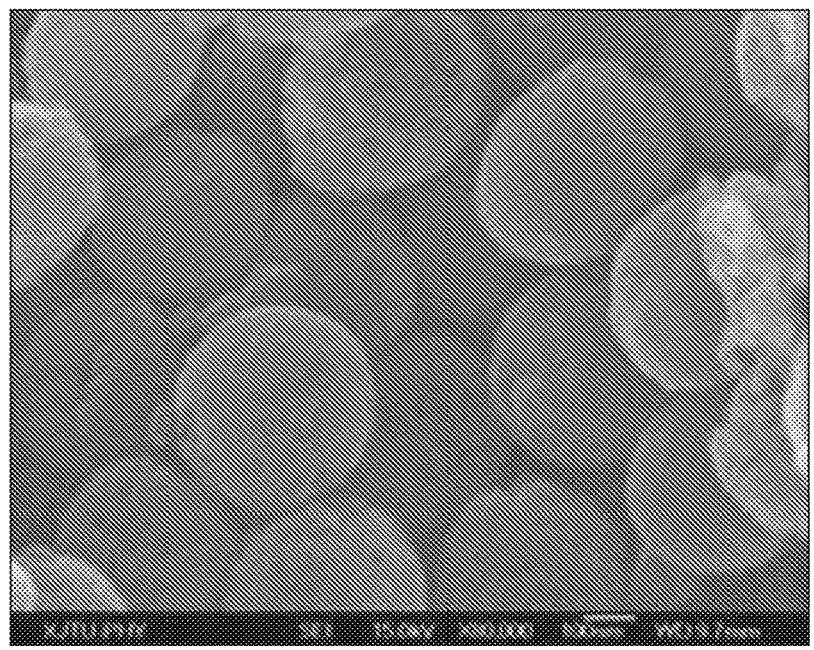
Figure 7D:
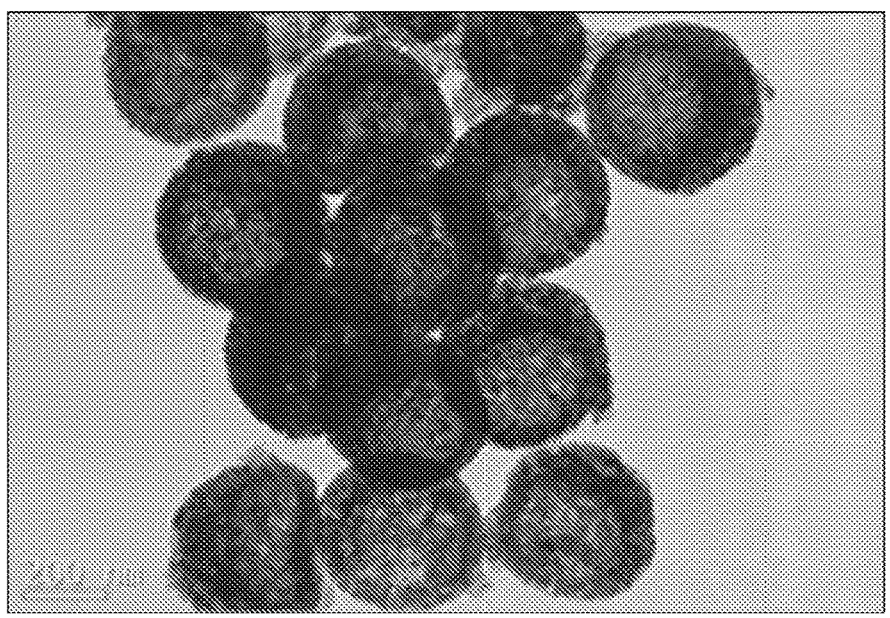

It was also noted that $SiO_2$ precursors could diffuse throughout the polymer shell layer, whereby forming $SiO_2$ particles within the micro-cavities. Therefore, in a next phase of the synthesis process, $SiO_2$ was selectively removed by an "etching" step, where a the carbonized $SiO_2$-carbon composite hollow spheres were treated with a hydrofluoric acid (HF) solution or a sodium hydroxide (NaOH) solution, leading to the formation of porous carbon hollow spheres. In some experiments, when hydrofluoric acid was used for "etching", HF concentration was 10%. It was also observed that the etching reaction could occur very quickly when HF was used at higher concentrations. Therefore, HF at 10% concentration was used in most subsequent etching reactions. In other experiments, when the etching step was performed with NaOH solutions, the NaOH concentration typically was 20%. The treatment time was typically 4 hours for both HF and NaOH. The morphology of the composite porous carbon hollow spheres after $SiO_2$ was removed is depicted in FIG. 5F.

Example 2

Filling Carbon Hollow Spheres with a Lithium Storage Material

This Example describes the filling of the porous carbon hollow spheres that have been prepared according to Example 1 above, by using a low-temperature molten salt filling method.

The porous carbon hollow spheres were filled with a mixture of crystal water and salt. The salt used in this experiment was either stannic acid ($SnO_2$) or ferric oxide ($Fe_2O_3$). The salt was first converted into liquid by melting or by dissolving it in ethyl alcohol. Subsequently, 1 gram of carbon hollow spheres was immersed into 5 mL liquid of stannous chloride or ferric chloride. It was observed that the use of liquid metal salt at this step was significantly advantageous, because liquid metal salt was found to easily diffuse into the micro-cavities of the porous carbon hollow spheres. In some experiments, the diffusion of the liquid metal salt was found to have been further enhanced by performing the filling step under negative-pressure conditions. A vacuum drying chamber was used with the vacuum degree set at maximum level. The porous CHSs filled with the liquid metal salt precursor were subsequently collected by depositing the metal salt-filled porous CHSs on a piece of filter paper and repeatedly washed with a water and ethyl alcohol mixture. Subsequently, the metal salt-filled porous CHSs were heated in a tubular furnace to a temperature of about 500° C. in the presence of an inert gas feeding (for example nitrogen), in which the precursor of the metal salt was converted into a metal oxide. It was observed that to achieve an effective conversion of the metal salt to metal oxide, different metal salts had different optimal temperatures. Optimal temperatures for effective conversion were subsequently determined to be about 250° C. to about 500° C. for most metal salts that have been tested to date.

The morphologies of the carbon hollow spheres filled with stannic oxide ($SnO_2$) and ferric oxide ($Fe_2O_3$) are shown in FIGS. 6 and 7, respectively.

FIGS. 6A-D show SEM (6A and 6C) and TEM (6B and 6D) images of $SnO_2$-filled porous carbon hollow spheres prepared in accordance with the procedure described above.

FIGS. 7A-D show (7A and 7C) and TEM (7B and 7D) images of $Fe_2O_3$-filled porous carbon hollow spheres prepared in accordance with the procedure described above.

The results presented in this Example suggest that the carbon hollow spheres prepared in accordance with the procedures disclosed herein showed no occurrence of structural damage, and the as-prepared carbon hollow spheres have highly uniform sizes. As described in further detail in Example 3 below, both types of carbon hollow spheres could produce superior cycling performance.

Example 3

Figure 8:
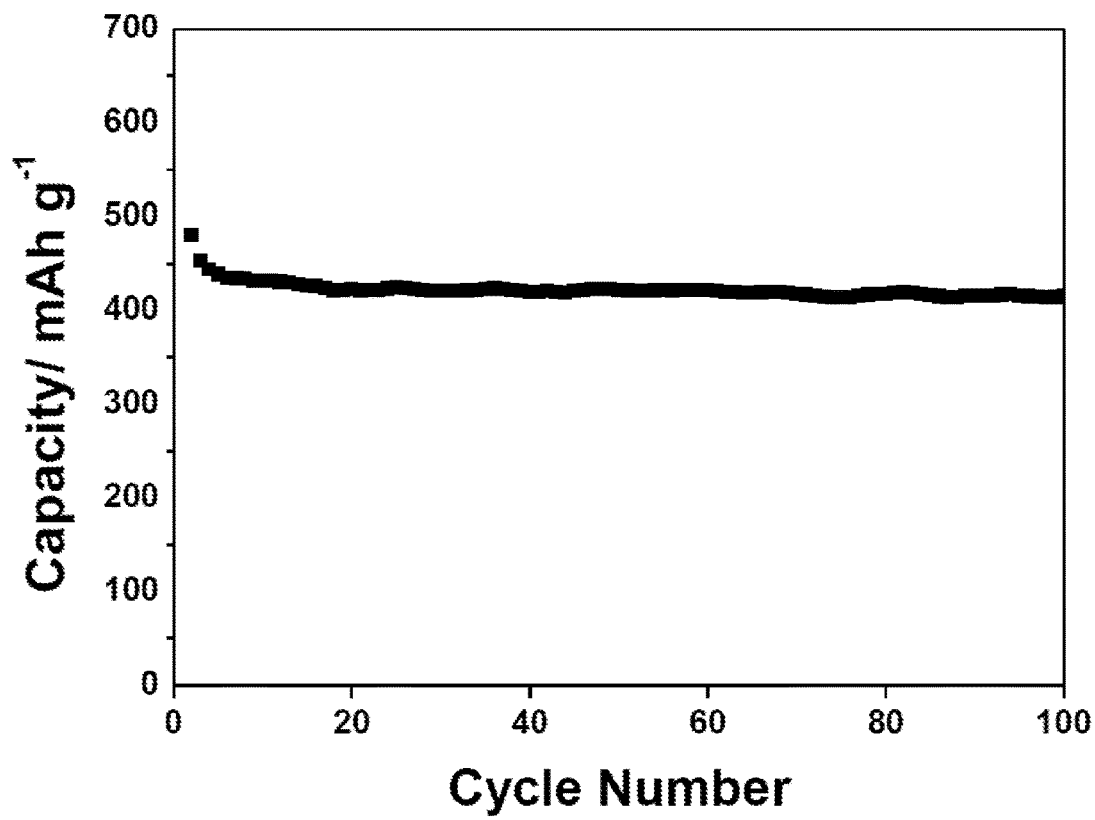
FIG. 8 is a graphical presentation of the cycling performance of Fe$_2$O$_3$-filled porous carbon spheres at a current density of 400 mA g$^{-1}$.
Figure 9:
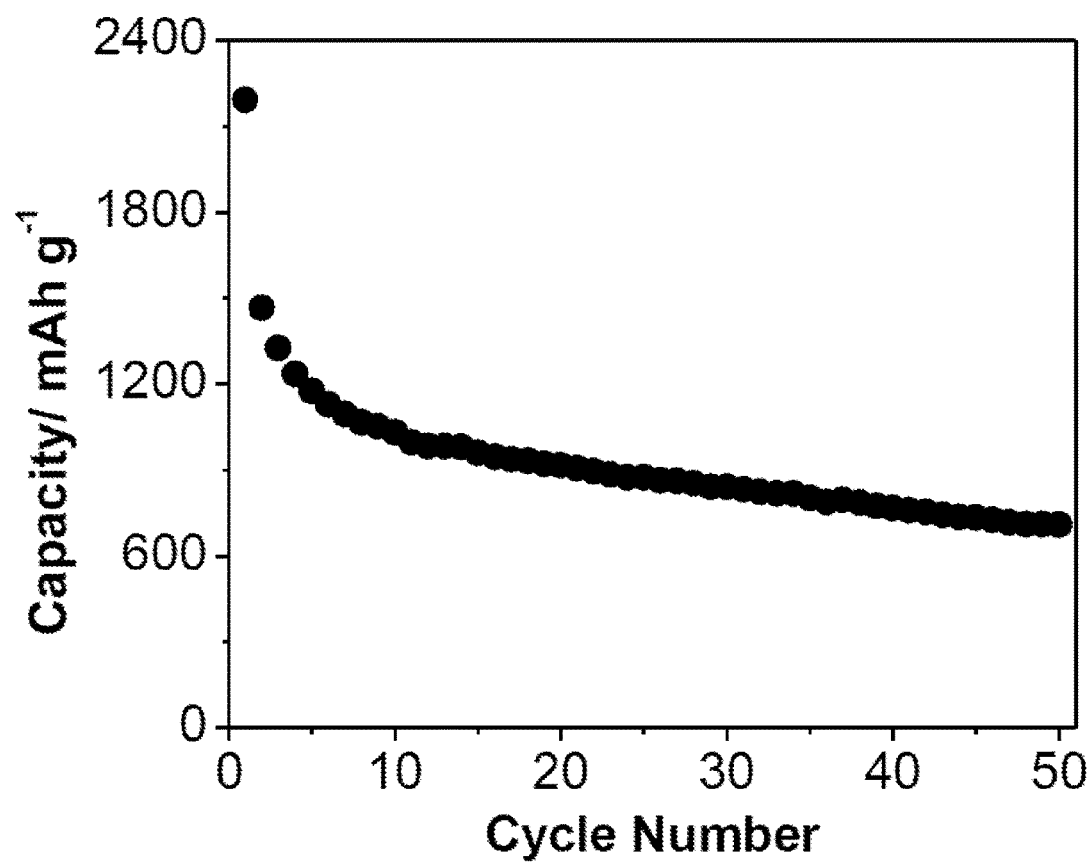
FIG. 9 is a graphical presentation of the cycling performance of SnO$_2$-filled porous carbon spheres at a current density of 400 mA g$^{-1}$.

Effect of the Filler Materials, Filling Amount, and Porous Structure on the Performance of the Porous Carbon Hollow Spheres The cycling performance of the $SnO_2$-filled porous carbon hollow spheres and the $Fe_2O_3$-filled porous carbon hollow spheres prepared according to the methods described in Examples 1 and 2 was performed at a current density of 400 mA g$^{-1}$ following standard procedures. The primary testing data are shown in FIG. 8 and FIG. 9. It was observed that both types of carbon hollow spheres could produce high levels of initial discharge and charge capacities, and showed superior cycling performance. In particular, the discharge capacity of the $SnO_2$-filled porous carbon hollow spheres was found to exceptionally stable and remained at a relatively constant level of approximately 450 mA h g$^{-1}$ during 100 cycles (FIG. 8), which indicated a high structural stability of the $SnO_2$-filled porous carbon hollow spheres. Stated differently, the stable and relatively high discharge capacity of the $SnO_2$-filled porous carbon hollow spheres after 100 cycles could be attributed to a superior structural stability of these spheres. On the other hand, the initial discharge capacity of the $Fe_2O_3$-filled porous carbon hollow spheres was found to be much higher than that of the $SnO_7$-filled porous carbon hollow spheres. However, this discharge capacity appeared to decrease continuously from approximately 1500 to 800 mA h g$^{-1}$ during 50 cycles (FIG. 9). This gradual decrease in the discharge capacity of the $Fe_2O_3$-filled porous carbon hollow spheres could be attributed to the gradual destruction of the structure of these spheres, suggesting that the $Fe_2O_3$-filled porous carbon hollow spheres were structurally less stable compared to the $SnO_2$-filled porous carbon hollow spheres, at least during the tested 50 cycles. The results presented in this Example suggest that filler materials, filling amounts, and/or the mesoporous structure of the carbon hollow spheres disclosed herein had a pronounced effect on their performance. These results in turn could provide good guidance for further development of novel carbon hollow spheres.

With respect to the use of substantially any plural and/or singular terms herein, those having skill in the art can translate from the plural to the singular and/or from the singular to volume of wastewater can be received in the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into sub-ranges as discussed above. Finally, as will be understood by one skilled in the art, a range includes each individual member. Thus, for example, a group having 1-3 articles refers to groups having 1, 2, or 3 articles. Similarly, a group having 1-5 articles refers to groups having 1, 2, 3, 4, or 5 articles, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

What is claimed is:

1. A method to prepare one or more porous carbon hollow spheres, the method comprising:
    contacting one or more polymer hollow spheres with a $SiO_2$ precursor in a mass ratio of about 1:4 to about 1:2 to form one or more $SiO_2$-containing polymer hollow spheres;
    carbonizing the one or more $SiO_2$-containing polymer hollow spheres to form one or more $SiO_2$-containing carbon hollow spheres; and
    removing $SiO_2$ from the one or more $SiO_2$-containing carbon hollow spheres to form the one or more porous carbon hollow spheres.

2. The method of claim 1, wherein the one or more polymer hollow spheres comprise at least one polystyrene hollow sphere, at least one polymethyl acrylate hollow sphere, at least one polymethyl methacrylate hollow sphere, at least one cross-linked polymer hollow sphere, or any combination thereof.

3. The method of claim 1, wherein contacting the one or more polymer hollow spheres with the $SiO_2$ precursor is performed for about 0.5 hours to about 10 hours.

4. The method of claim 1, wherein the $SiO_2$ precursor comprises butyl orthosilicate, propyl orthosilicate, tetraethyl orthosilicate (TEOS), or any combination thereof.

5. The method of claim 1, wherein contacting the one or more polymer hollow spheres with the $SiO_2$ precursor is performed in presence of at least one alcohol selected from the group consisting of butanol, ethanol, isopropyl alcohol, methanol, propanol, or any combination thereof.

6. The method of claim 5, wherein the at least one alcohol comprises an alcohol solution having a volume ratio of water to alcohol of about 1:10 to about 1:4.

7. The method of claim 1, wherein carbonizing the one or more $SiO_2$-containing polymer hollow spheres is performed at a temperature of about 500° C. to about 900° C.

8. The method of claim 1, wherein carbonizing the one or more SiO2-containing polymer hollow spheres is performed for about 0.5 hours to about 10 hours.

9. The method of claim 1, wherein removing SiO2 from the one or more SiO2-containing carbon hollow spheres comprises contacting the one or more SiO2-containing carbon hollow spheres with at least one etching reagent.

10. The method of claim 9, wherein contacting the one or more SiO2-containing carbon hollow spheres with the at least one etching reagent is performed for about 0.5 hours to about 12 hours.

11. The method of claim 1, further comprising sulfonating the one or more polymer hollow spheres with at least one sulfonating reagent before contacting with the SiO2 precursor.

12. The method of claim 11, wherein sulfonating the one or more polymer hollow spheres is performed at a temperature of about 15° C. to about 90° C.

13. The method of claim 11, wherein sulfonating the one or more polymer hollow spheres is performed for about 2 hours to about 72 hours.

* * * * *